US006625226B1

(12) United States Patent
Gersho et al.

(10) Patent No.: US 6,625,226 B1
(45) Date of Patent: Sep. 23, 2003

(54) VARIABLE BIT RATE CODER, AND ASSOCIATED METHOD, FOR A COMMUNICATION STATION OPERABLE IN A COMMUNICATION SYSTEM

(76) Inventors: Allen Gersho, 815 Volante Pl., Goleta, CA (US) 93117; Vladimir Cuperman, 5635 Cielo Ave., Goleta, CA (US) 93117; Jan Linden, 6661 Birkshire Ter., #7, Goleta, CA (US) 93117; Ajit V. Rao, 6754 Abrego Rd., #4, Goleta, CA (US) 93117; Sassan Ahmadi, 7506 Charmant Dr., #815, San Diego, CA (US) 92122; Fenghua Liu, 11632 Aspen View Dr., San Diego, CA (US) 92128; Ryan Heidari, 563 Via Villenos, Encinitas, CA (US) 92024

( * ) Notice: Subject to any disclaimer, the term of this patent is extended or adjusted under 35 U.S.C. 154(b) by 0 days.

(21) Appl. No.: 09/455,012

(22) Filed: Dec. 3, 1999

(51) Int. Cl.[7] .......... H04B 15/00

(52) U.S. Cl. .......... 375/285; 375/222; 375/254; 455/67.3

(58) Field of Search .......... 375/253, 240, 375/254, 222, 285, 220, 225, 227; 455/115, 501, 63, 67.3; 370/232, 252, 465, 253, 493, 494, 495, 537, 543

(56) References Cited

U.S. PATENT DOCUMENTS

| | | | | | |
|---|---|---|---|---|---|
| 4,890,316 | A | * | 12/1989 | Walsh et al. | 379/93.33 |
| 4,991,184 | A | * | 2/1991 | Hashimoto | 375/219 |
| 5,159,611 | A | * | 10/1992 | Tomita et al. | 375/254 |
| 5,513,213 | A | * | 4/1996 | Patel et al. | 375/222 |
| 6,252,854 | B1 | * | 6/2001 | Hortensius et al. | 370/252 |

* cited by examiner

*Primary Examiner*—Phoung Phu
(74) *Attorney, Agent, or Firm*—Milan I. Patel

(57) ABSTRACT

A variable bit rate coder, and an associated method, for encoding a frame of speech, such as frames of data generated during operation of a communication station operable in a cellular communication system. Selection of the coding rate is made responsive to indicia of actual coding performance of a coder at more than one coding rate.

17 Claims, 5 Drawing Sheets

VARIABLE BIT RATE CODER, AND ASSOCIATED METHOD, FOR A COMMUNICATION STATION OPERABLE IN A COMMUNICATION SYSTEM

The present invention relates generally to the communication of digital information, such as speech data communicated in a cellular, or other radio, communication system. More particularly, the present invention relates to a variable bit rate coder, and an associated method, by which to encode the digital information at a selected bit rate. Selection of the coding rate is made responsive to indicia of actual coding performance, subsequent to encoding of the information at more than one coding rate.

BACKGROUND OF THE INVENTION

Advancements in communication technologies have permitted the introduction of, and popularization of, new types of, and improvements in existing, communication systems. Increasingly large amounts of data are permitted to be communicated at increasing thruput rates through the use of such new, or improved, communication systems. As a result of such improvements, new types of communications, requiring high data thruput rates, are possible. Digital communication techniques, for instance, are increasingly utilized in communication systems to communicate efficiently via digital data, and the use of such techniques has facilitated the increase of data thruput rates.

When digital communication techniques are used, information which is to be communicated is digitized. For example, when the information is formed of speech, such as that generated by a user using a mobile station of a cellular communication system, the speech is digitized, then signal processing operations are performed upon the digitized speech, and, then, quantization operations are performed upon the digitized speech. The result forms a compressed bit stream, referred to as speech data.

Conventionally, the speech initially in the form of a speech waveform, is first partitioned into a sequence of successive frames of constant length. Then, the operations noted above are performed to form the compressed bit stream which is sometimes formatted into packets of data. Such packets typically also include groups of bits which specify parameters used, at a receiving station to reconstruct the speech.

In a conventional analysis-by-syntheses ("AbS") coding of speech, the speech waveform is partitioned into a sequence of successive frames and each frame has a fixed length and is partitioned into an integer number of equal length subframes. The encoder generates an excitation signal by a trial and error search process whereby each candidate excitation for a subframe is applied to a synthesis filter and the resulting segment of synthesized speech is compared with a corresponding segment of target speech. A measure of distortion is computed and a search mechanism identifies the best (or nearly-best) choice of excitation of each subframe among an allowed set of candidates. The candidates are sometimes stored as vectors in a codebook; in this case, the coding method is called CELP (code excited linear prediction). At other times, the candidates are generated as they are needed for the search by a predetermined generating mechanism; this case includes in particular multipulse linear predictive coding (MP-LPC) or algebraic code excited linear prediction (ACELP). The bits needed to specify the chosen excitation subframe are part of the package of data that is transmitted to a receiving station in each frame. Usually the excitation is formed in two stages, where the first approximation to the excitation subframe is selected by the ab0ve-described procedure, and then a modified target signal for the subframe is formed as the new target for a second AbS search operation Depending on the periodic or aperiodic character of the speech, different coding strategies can be employed. In order to eliminate as much redundancy as possible in coding the excitation signal for each frame, it is often desirable to classify the frames into categories. The coding method can then be tailored to each category.

In voiced speech, the energy peaks of the smoothed residual energy contour generally occur at pitch period intervals and correspond to pitch pulses. Pitch here refers to the fundamental frequency of periodicity in a segment of voiced speech and pitch period refers to the fundamental period of periodicity. In some transitional regions of the speech signal, the waveform does not have the character of being periodic or stationary random and often it contains one or more isolated energy bursts, as in plosive sounds. The unvoiced class consists of frames which are aperiodic and where the speech appears random-like in character, without strong isolated energy peaks. The silent class refers to frames where speech is absent but some background noise may be present.

In a typical implementation, the sampling rate is 8000 samples per second, the frame size is 160 samples. Each frame is classified into one of several classes, e.g., voiced, unvoiced, silence, transition. Other ways of classification include use of two voicing classes, e.g., weakly voiced, and strongly voiced voicing classes.

Coding techniques in general can be categoried according to several different manners by which to encode a frame of speech.

For instance, one category of encoding is referred to as fixed bit-rate coding. In a fixed bit-rate coding technique, every encoded frame of speech encoded by a particular fixed bit-rate coding technique is formed of the same number of bits. That is to say, an encoded frame of speech, encoded by a fixed bit-rate coding technique, is formed of a fixed number of bits.

In a discontinuous transmission (DTX) technique, a determination is made whether a frame of speech which is to be encoded is formed of active speech bits. If the frame is determined to be formed of active speech bits, a fixed bit allocation is applied to each of such frames. If a determination is made that the frame does not contain active speech bits, a reduced bit allocation is applied to such frames, such as "silent" frames.

In a dynamically-variable, bit-rate coding technique, each frame of speech is encoded using a different number of bits. In this technique, a large range of possible bit allocations of the encoded frame is possible, e.g., any integral number of bits up to some maximum value.

And, in a multi-class, variable bit-rate coding technique, each frame of speech is assigned, by way of a class selection procedure, to be one amongst a set of allowed classes. Each of such classes is associated with a particular allocation of bits for various parameters of the frame. And, all frames assigned to a single class have the same bit allocation. Class selection of a speech frame is based, for instance, upon a phonetic classification of the frame in which the major characteristics of the frame are classified according to the phonetic character of that frame of speech. More generally, a classifier is utilized to operate upon input speech applied to an encoder, once frame-formatted, or upon a linear prediction residual obtained from the input speech, to extract parameters better then combined to make a class decision. Typically, a relatively small number of classes, e.g., between three and six classes, are employed in speech coding when using a multi-class, variable bit-rate coding technique.

In some situations, different coding algorithms are applied to different classes. In some coders, two different classes may have the same total number of bits allocated for the frame but may differ in how the bits are allocated to different speech parameters of the frame. As long as all the classes do not have the same total bit allocation for the frame, a coder is considered to be a variable rate coder. In multi-class coders, each class has a different bit allocation so that any class selection mechanism controls the instantaneous bit rate of the coder. And, such a mechanism is referred to as a rate determination algorithm. The instantaneous bit rate at a particular time is merely the ratio of the number of bits allocated to the current frame divided by the time duration of the frame.

Fixed bit-rate coding techniques do not require a rate control mechanism and, therefore, are typically less complex than counterparts which require rate control mechanisms. Multi-class, variable bit-rate coding techniques and dynamically-variable, bit-rate coding techniques, in contrast, require a rate determination algorithm. But, variable rate coding techniques are generally more efficient as such techniques exploit the time-varying statistical properties of speech. A rate determination algorithm utilized in such techniques generally attempts to minimize the average bit-rate while ensuring that at least a minimum speech quality is maintained. The average bit-rate is particularly important in a cellular communication system which utilizes a CDMA (code-division, multiple-access) communication scheme as well as in communication applications in which voiced data is stored.

The average bit rate of a multi-class, variable bit-rate coding technique depends upon the rate determination algorithm as well as on the statistical character of input speech frames that are to be encoded. By modifying the parameters of the rate determination algorithm, the average bit rate can be altered.

Multi-class, variable bit-rate coding techniques are needed, for instance, for CDMA, cellular communication systems proposed for future installation, capable of operating at several different average bit rates. A coder which would be operable in such a manner would be operable pursuant to a selected one of several operating modes, wherein each operating mode is associated with a particular average bit rate.

A multi-class, variable bit-rate coding technique, and associated coder, capable of operating in more than one mode and which is capable of selecting which mode in which to encode a frame of data would therefore be advantageous.

It is in light of this background information related to the communication of digital information that the significant improvements of the present invention have evolved.

SUMMARY OF THE INVENTION

The present invention, accordingly, advantageously provides a variable bit rate coder, and an associated method, by which to encode a frame of data at a selected encoding rate.

Selection of which of at least two bit rates at which to encode a frame of data is made responsive to indicia of actual coding performance of the coder at the different bit rates. Thereby, selection of which rate at which to encode a frame of data is made responsive to actual encoding of the data, not merely an estimate of the encoding of the data. Because indicia of actual coding of the frame of data is utilized to determine at which rate to select bit rate at which the resultant, encoded frame is to be formed, a better tradeoff between coding rate and thruput rate is obtainable.

In one aspect of the present invention, a multi-class, variable bit-rate coder is provided for a radio transmitter, such as the transmitter portion of a cellular mobile terminal. The coders are operable to receive a frame of speech and to generate an output frame of encoded speech data, encoded at a selected bit rate. The coders are operable to encode the frame of speech at two or more bit rates. Analysis is made of the frame of speech encoded at each of the two or more bit rates. Responsive to the analysis of the frame of speech data, subsequent to encoding of the corresponding frame of speech at the at least two coding rates, a decision is made as to of which coding rate the encoded frame should be formed. If the characteristics of the frame, encoded at a lower of two or more coding rates are acceptable, a decision is made to utilize the frame of speech data, encoded at the lower coding rate. Thereby, improved thruput rates of the resultant, transmitted frame is possible while still ensuring that, if necessary, a higher coding rate shall be used.

In another aspect of the present invention, a coder is provided for a communication station operable in a cellular communication system, such as a CDMA (code-division, multiple-access) system. Speech, once digitized and formatted into frames, is provided to the coder. The speech frames are either voiced frames, unvoiced frames, or silent frames. Each frame of speech is first applied to a classifier which classifies the frame to be one of the aforementioned frame-types. When the frame is determined to be a silent frame, the frame is applied to a silent encoder which encodes the silent frame of speech at a silent-encoding rate. If, conversely, the classifier determines the frame of speech to be an unvoiced frame, the frame is applied to an unvoiced encoder which encodes the frame of speech at an unvoiced-encoding rate. And, if the classifier classifies the frame of speech to be a voiced frame, the classifier applies the frame of speech to at least two voiced encoders, each capable of encoding the frame at a different coding rate. For instance, in one implementation, the coder includes two voiced coder elements, one operable to encode the frame of speech at a bit rate of 4.0 Kb/s, and a second voice coder element operable to encode the data at a rate of 8.5 Kb/s. The voiced coders encode the frame of speech applied thereto, and indicia of the encoded frames formed by the respective voiced coders are provided to a selector. The selector is operable responsive to the indicia provided thereto to select one of the voiced coder elements to be used to form the resultant, encoded frame of speech when the classifier determines the frame of speech to be a voiced frame. Because selection is made by the selector of the coding rate responsive to actual indicia of the encoded frame of speech data, improved selection of the coding rate is provided.

In another aspect of the present invention, a coder is provided for a communication station, also operable in a cellular communication system, such as a CDMA (code-division, multi-access) cellular communication system. Frames of speech are provided to the coder subsequent to digitizing and formatting of the speech into the frames. The frames are selectively of voiced data, unvoiced data, and silent data. Each frame is provided to a silence coder, an unvoiced coder, and at least two voiced coders. Each coder encodes the frame of speech applied thereto according to a respective coding rate. The two voiced coder elements are operable at separate coding rates. Indicia of the encoded frames encoded by each of the coders is provided to a selector. The selector is operable responsive to such indicia to determine from which coder element the resultant, encoded frame should be formed. Thereby, selection is made responsive to actual encoded frames of speech rather than estimates of such coded frames.

In these and other aspects, therefore, a variable bit rate coder, and an associated method, is provided for a sending station operable in a communication system. The sending station sends an encoded set of data upon a communication channel. The encoded data is an encoded representation of digital information. The variable bit rate coder codes the digital information into the encoded data. A first bit rate coder element is coupled to receive the digital information. The first bit rate coder element codes the digital information at a first coding rate to form a first-coded set of data. A second bit rate coder element is also coupled to receive the digital information. The second bit rate coder element codes the digital information at a second coding rate to form a second-coded set of data. A coding rate selector is coupled to receive at least indicia of the coding-rate performance of the first bit rate encoder element and of indicia of the coding-rate performance of the second bit rate encoder element. The coding rate selector selects the encoded data to be formed of a selected one of the first-coded set of data and the at least the second-coded set of data. Selection by the coding rate selector is responsive to values of the indicia of the coding-rate performance of the first and at least second bit rate coder elements, respectively.

The present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
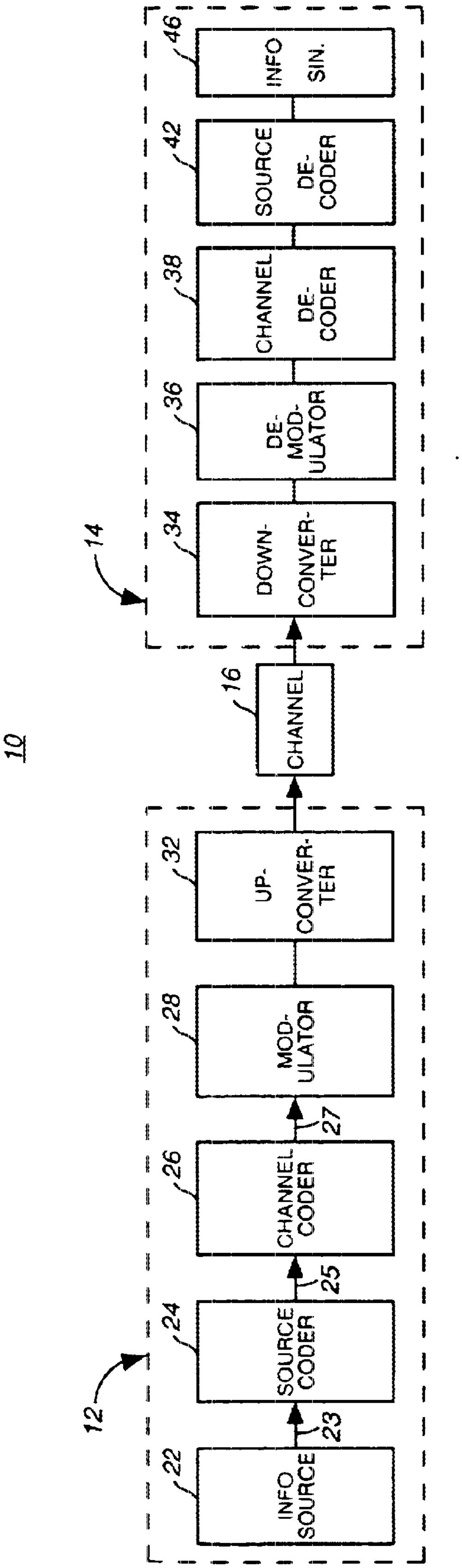
FIG. 1 illustrates a functional block diagram of a communication system in which an embodiment of the present invention is operable.

FIG. 1 illustrates a communication system, shown generally at 10, in which an embodiment of the present invention is operable. While the following description shall be described with respect to an exemplary implementation in which the communication system 10 forms a cellular communication system, such as a CDMA (code-division, multiple-access) communication system, it should be understood that such description is by way of example only. Operation of an embodiment of the present invention is similarly operable in other types of communication systems, both non-wireline and wireline in nature. Accordingly, operation of an embodiment of the present invention can analogously be described with respect to such other types of communication systems.

The communication system 10 is here shown to include a sending station 12 and a receiving station 14 coupled by way of a communication channel 16. The sending station 12 is here representative of the transmit portion of a mobile station operable in a cellular communication system. And, the receiving station 14 is here representative of the receive portion of network infrastructure of the cellular communication system, respectively. As a cellular communication system generally provides for two-way communications, the sending station and receiving station are also representative of the transmit and receive portions of the network infrastructure and of the mobile station of the cellular communication system.

While operation of the communication system shall be described with respect to communication by the sending station 12 upon a reverse-link channel to the receiving station, operation can similarly be described with respect to communication of information upon a forward-link channel defined to extend between the network infrastructure and the mobile station of the communication system. In the exemplary implementation, the communication system forms a digital communication system in which frames, or other blocks, of digital information are transmitted between the sending station 12 and the receiving station 14.

The sending station 12 generates information at an information source 22. The information source is also representative of externally-generated information, provided to the sending station. An information signal formed by the information source 22 is provided by way of a line 23 to a source encoder 24. In the exemplary implementation, the information signal is an electrical representation of speech waveform. Prior to application to the encoder 24, the speech waveform is partitioned into a sequence of successive frames of constant length. The frames are of any of three types. Namely, each frame is a selected one of a voiced frame, an unvoiced frame, or a silent frame. The source encoder 24 is operable, as shall be described below, pursuant to an embodiment of the present invention.

In the exemplary implementation, the source coder 24 forms a multi-class variable bit rate speech coder. In other implementations, the source coder alternately forms a dynamically-variable, bit-rate coder. In operation, the coder 24 chooses a bit-rate most appropriate by which to code each frame of speech applied thereto. Selection of the most-appropriate bit-rate is obtained by exercising each bit-rate option by which a frame of speech can be encoded and thereafter selecting the bit rate that corresponds to a given average rate or quality requirement. Speech quality resulting from different bit rates at which the frame is encoded is estimated by any one, or more, of several measures. For instance, a perceptually Weighted Mean Squared Error (WMSE) a perceptually Weighted Signal-to-Noise Ratio (WSNR), a Bark Spectral Distortion (BSD), as well as other, quantitative measures of perceived speech quality can be utilized to make the selection. Selection can also be made responsive to a suitable indicator of QOS (quality of service) measurable, or determinable, by an individual frame of speech. Any of such measurements are used by a set of logical rules which provide an effective trade-off between quality measurements and bit-rate at which a frame of speech is encoded. A user, or service provider, is able to achieve a target speech quality, or target bit-rate, by choosing the value of a free variable set forth in the set of logical rules. In contrast to conventional coding techniques in which an appropriate bit rate is determined solely from an input provided to the coder, operation of an embodiment of the present invention takes into account the speech quality obtained as a result of coding of a frame of speech.

In the exemplary implementation, the source coder 24 encodes each frame of speech applied thereto at a selected channel coding, or bit, rate. Selection of the bit rate at which the frame encoded by the source coder and applied to the modulator 28 is made responsive to indicia of actual coding of the frame at more than one bit rate, at least when the frame of speech is a voiced frame.

The frame of encoded speech formed by the channel coder 24 forms a frame of speech data which is applied by way of line 25 to a channel encoder 26. The channel coder channel-encodes each frame of data applied thereto, for example, to increase the diversity of the frame to overcome fading exhibited by the channel 16. Channel-encoded frames are then provided to a modulator 28. The modulator is operable to modulate the frames of encoded data applied thereto by the channel coder 26. Once modulated, the modulated frames are applied to an up-converter 32 which up-converts the modulated frames applied thereto to radio frequencies, permitting their transmission upon the communication channel 16.

The receiving station 14 includes a down-converter 34 for down-converting the frames of data from a radio, to a base band, frequency. Once down-converted in frequency, the down-converted frame is provided to a demodulator 36 which demodulates the frame of data and, in turn, applies a demodulated frame to the channel decoder 38. The channel decoder is operable to channel-decode the frame of data applied thereto. Channel-decoded frames generated by the channel decoder 38 are applied to a source decoder 42 which is operable to source-decode the frame applied thereto and to provide a source-decoded frame to an information sink 46.

Figure 2:
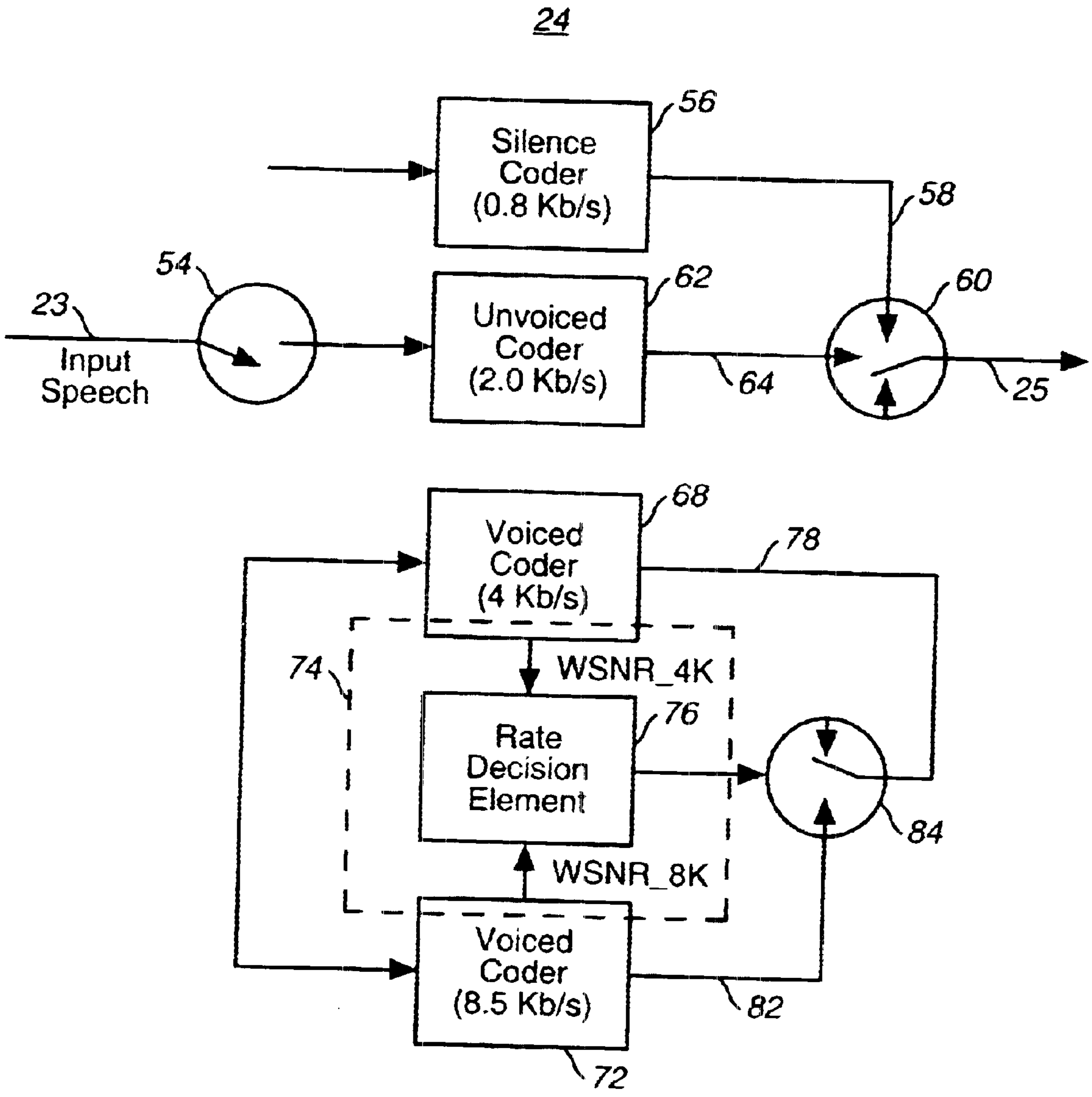
FIG. 2 illustrates a functional block diagram of a variable bit rate coder of an embodiment of the present invention.

FIG. 2 illustrates the source coder 24 of an embodiment of the present invention and which forms a portion of the sending station shown in FIG. 1. Frames of speech formed by the source coder 24 are provided, by way of the line 23 to a classifier 54. The classifier 54 is operable to analyze each frame of speech applied to the source coder and to classify each frame to belong to one of three categories: a silent frame, an unvoiced frame, or a voiced frame. If the classifier assigns the frame to be a silent frame, the frame is provided to a silent coder element 56 which codes the frame applied thereto at a silent-rate bit-coding rate. In the exemplary implementation, a silent frame is coded at 0.8 Kb/s. The encoded frame of speech data generated by the silent coder element 56 is generated on the line 58 which is selectively coupled to the line 25 by way of the element 60.

If the classifier 54 determines the frame of speech applied thereto by way of the line 25 to be an unvoiced frame, the frame is provided to an unvoiced coder element 62. The unvoiced coder element 62 codes the frame of speech applied thereto at an unvoiced-coding rate. In the exemplary implementation, the unvoiced coding rate is 2.0 Kb/s. The frame encoded by the coder element 62 is generated on the line 64 which is selectively applied to the line 25 by way of the element 60.

If the classifier 54 determines the frame of speech applied thereto to be a voiced frame, the frame is provided to both a first voiced coder element 68 and a second voiced coder element 72. The first voiced coder and the second voiced coder are both encoders for voiced speech. While the coder 24 of the exemplary implementation includes two voiced coder elements, in other implementations, additional voiced coder elements are utilized. The first voiced coder element 68 codes the frame provided thereto at a first coding rate, here 4 Kb/s. And, the second voiced coder element 72 codes the frame at an 8.5 Kb/s bit rate. The rate determination algorithm, here shown by the block 74, shown in dash, examines the measure of the performance achieved on the frame of speech by each of the coder elements 68 and 72. Responsive to such measures of performance, a decision is made, here represented by a rate decision element 76, of which of the two rates to use to form the encoded frame of speech data, when forming a speech frame, to be generated on the line 25. The frame encoded at the first bit rate by the first voiced coder element 60 is generated on the line 78. And, the frame encoded at the second bit rate by the second voice coder element 72 is generated on the line 82. A selected one of lines 78 and 82 is coupled to the line 25 by way of the element 60 and also the element 84. Control of the element 84 is effectuated by the rate decision element 76 on the line 86.

In the exemplary implementation, the voiced coder elements 68 and 72 utilize Analysis-by-Synthesis (AbS) schemes, as normally utilized in Code Excited Linear Prediction (CELP) coding. When utilizing an AbS coding scheme, a synthesized speech signal for the frame, or a subset of the frame, is chosen by a trial and error search process. Each signal selected from a codebook of allowed excitation signals is applied to an analysis filter to generate a synthetic speech signal. A degree of match between the synthetic and original signals is computed by way of a perceptually weighted distortion measure. The excitation signal that results in a closest match between the original and synthetic speech signals is selected, and the index corresponding to the selected excitation is transmitted to the decoder (in FIG. 1, the decoder 42). The weighted distortion measure offers a convenient choice of quality measure to be utilized by the rate determination algorithm 74. Once the search process is completed, the corresponding weighted distortion measure achievable for the particular frame of speech data with the particular encoder is available.

Here, selection is made between utilization of a frame generated by the coder element 68 or the coder element 72. The same frame of data is encoded both at the 4.0 Kb/s coding element and also by the 8.5 Kb/s coding element. For an original speech signal vector, $s_{orig}$, in the frame, $s_{4k}$, and $s_{8k}$ are the output speech signals generated by the encoders 68 and 72, respectively. W is a perceptual weighting matrix. The perceptually weighted signal-to-noise ratio (WSNR) measures associated with the first and second voice coder elements 68 and 72 are as follows:

$$WSNR_{4k} = 10\log_{10}\frac{\|Ws_{orig}\|^2}{\|W[s_{orig} - s_{4k}]\|^2} \text{ and}$$

$$WSNR_{8k} = 10\log_{10}\frac{\|Ws_{orig}\|^2}{\|W[s_{orig} - s_{8k}]\|^2}$$

A set of logical rules is implemented by the algorithm 74, here to trade-off the quality advantage obtained by the higher coding rate of the element 72 against the additional bit-rate requirements of the coder element. The set of logical rules are as follows:

If $WSNR_{4k} > \lambda$dB, use the 4 Kb/s encoder.

Else if $WSNR_{8k} < \alpha * WSNR_{4k} + \beta$, use the 4 Kb/s encoder.

Else use the 8.5 Kb/s encoder.

The set of logical rules indicates that, if the quality of the frame of data formed by the first coder element 68 is at least a desired threshold level, the frame generated by the coder element 68 is utilized to form the output, encoded frame of speech data. If, however, the quality of the encoded frame generated by the coder element 68 is not of at least the desired threshold level, but the quality provided by the second voice coder element 72 is not significantly better, the frame of encoded speech data formed by the first coder element 68 is again utilized. Otherwise, the encoded frame of speech data generated by the coder element 72 is utilized. While WSNR measures are calculated in the exemplary implementation, more generally, any manner by which to weigh the perceptual significance of the distortion or noise at different frequencies can be utilized.

In the above set of logical rules, $\lambda$ and $\alpha$ are design parameters wherein $\lambda=5.0$ and $\alpha=1.6$. The parameter $\beta$ is selected such that the desired rate or quality object is achieved. In the exemplary implementation, $\beta=0.85$, thereby to obtain an average bit-rate of approximately 3.5 Kb/s in one-way communications. The parameter $\beta$ is utilized to adjust the average rate and different values of the parameter to correspond to various trade-offs between the average bit rate and the reconstructed speech quality.

Figure 3:
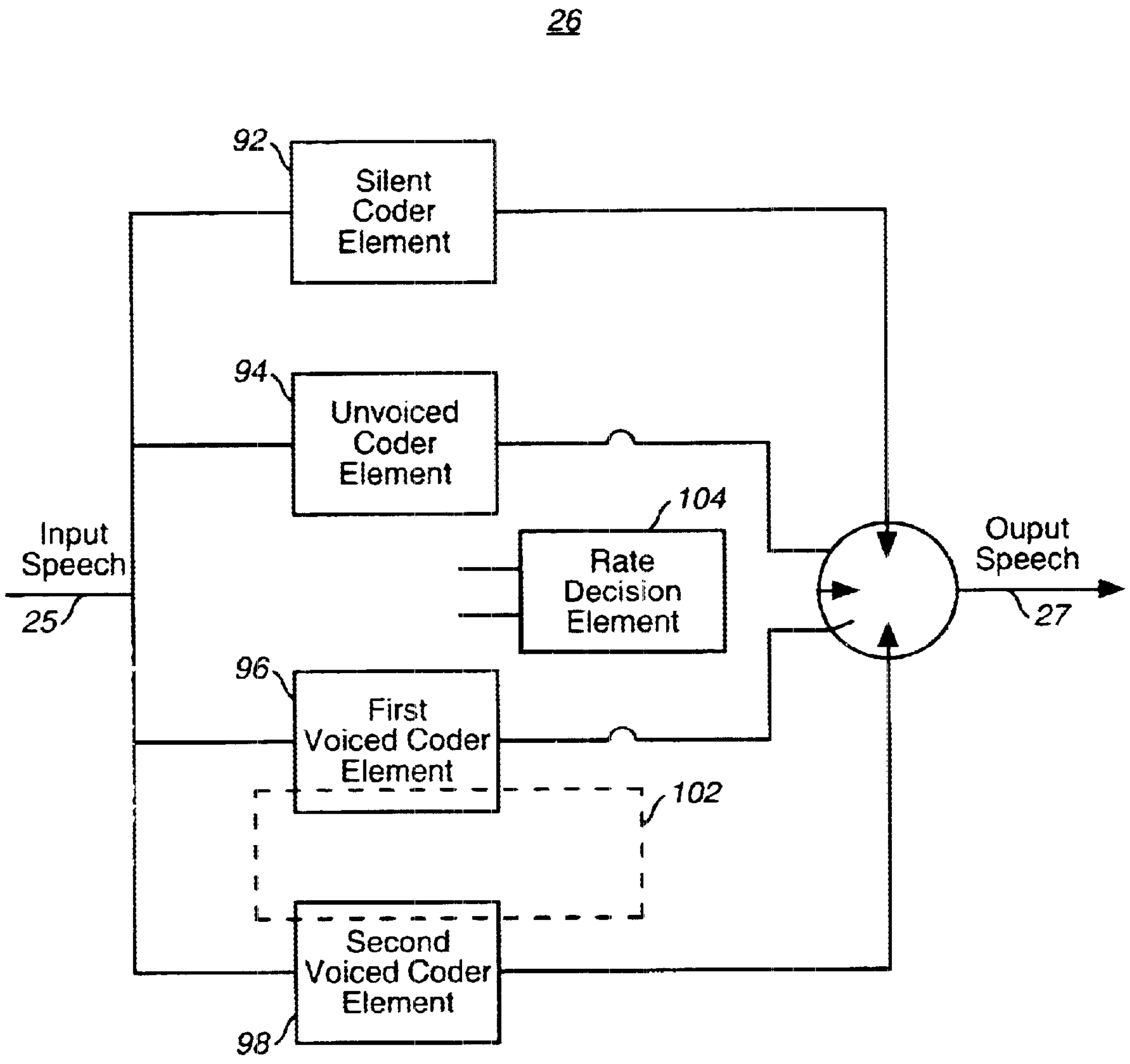
FIG. 3 illustrates a functional block diagram of a variable bit rate coder of another embodiment of the present invention.

FIG. 3 illustrates the coder 24 of another embodiment of the present invention. Here, the frames generated on the line 23 and provided to the coder 24 are provided to each of four coder elements. Namely, the line 25 is coupled to a silent coder element 92, an unvoiced coder element 94, a first voiced coder element 96, and a second voiced coder element 98. In other implementations, the coder 26 is formed of additional voice coder elements. A rate determination algorithm, here represented by the block 102 shown in dash, is operable to examine a measure of the performance achieved by the separate coder elements. And, a rate decision element 104 is operable to decide from which coder element the output, encoded frame of data generated on the line 27 should be. In the exemplary implementation, each of the voice coders employ analysis-by-synthesis (AbS) encoding schemes, normally utilized in Code Excited Linear Prediction (CELP) coding. The silent and unvoiced coder elements utilize fixed codebooks.

For an original speech vector, $s_{orig}$, and in which $s_{0.8k}$, $s_{3k}$, $s_{4k}$, and $s_{8k}$ define the output frames generated by the coders 92, 94, 96 and 98, respectively, and W is a perceptual weighting matrix, the four perceptually weighted signal-to-noise ratio (WSNR) measures are defined as follows:

$$WSNR_{0.8k} = 10\log_{10}\frac{\|Ws_{orig}\|^2}{\|W[s_{orig} - s_{0.8k}]\|^2},$$

$$WSNR_{2k} = 10\log_{10}\frac{\|Ws_{orig}\|^2}{\|W[s_{orig} - s_{2k}]\|^2},$$

$$WSNR_{4k} = 10\log_{10}\frac{\|Ws_{orig}\|^2}{\|W[s_{orig} - s_{4k}]\|^2}, \text{ and}$$

$$WSNR_{8k} = 10\log_{10}\frac{\|Ws_{orig}\|^2}{\|W[s_{orig} - s_{8k}]\|^2}$$

The trade-off of the quality advantage at the higher coding rate against the corresponding additional, required bit-rate is defined by a set of logical rules forming a rate-distortion rule. First, the following computations are made:

$$C_{0.8k}=WSNR_{0.8k}-0.8\lambda,\ C_{2k}=WSNR_{2k}-2\lambda,\ C_{4k}=WSNR_{4k}-4\lambda$$

and $$C_{8k}=WSNR_{8k}-8.5\lambda.$$

Once the above calculations are made, a determination is made of the largest of the quantities, $C_{0.8k}$, $C_{2k}$, $C_{4k}$, and $C_{8k}$, and thereafter selection is made of the new element corresponding to that quantity to encode the frame on the line 27. In the aforementioned equations, the parameter $\lambda$ is chosen to achieve the desired bit-rate, or, alternatively, the overall speech quality desired. Additional flexibility is achieved by adding aspects of the selection rules described in the implementation of the coder described with respect to FIG. 2. For example, $C_s$ denotes the performance measure that has the maximum value of the four choices, and R denotes the corresponding bit rate, and $WSNR_s$ denotes the corresponding quality, and if R is not the lowest rate, then $WSNR_b$ is the quality achieved at the next lower rate b and $\beta$ and $\alpha$ are suitable constants.

Thereafter, after finding $C_s$, the following set of logical rules are applied:

If $WSNR_s>k_s$, use the rate R.

Else if R is not the lowest rate and $WSNR_s<\alpha WSNR_b+\beta$, use the rate R.

Else use the next lower rate b.

In general, weight determination is defined by the following equation:

$$C=Q-\lambda R$$

wherein,

C is a measure of performance;

Q denotes a measure of speech quality for the frame;

R denotes the bit-rate for the frame; and $\lambda$ is a weighting parameter that controls the relative weight given to quality versus bit rate.

For a case in which $\lambda=0$, the quality is the only factor in performance assessment, and the rate is irrelevant. Conversely, when $\lambda$ is large, approaching infinity, essentially only the rate influences the performance measure. By selecting suitable values of $\lambda$, the relative importance of quality versus bit rate is controlled. For any particular value of $\lambda$, there is a particular value of the performance of C achieved by each choice coder. The coder which gives the maximum value of C for a given value of $\lambda$ gives the best performance for a given relative importance to the two goals of achieving high quality and low bit rate. Such criteria is modifiable by heuristic considerations to avoid using a higher rate than necessary if a lower rate gives almost the same quality, or almost the same performance.

While operation of an embodiment of the present invention requires two or more trial encodings of a frame of speech, an increase in complexity required by the multiple number of trial encodings can be avoided by the use of a simple structural constraint applied to the fixed codebook of a CELP encoder. One method is to make the lower rate codebook a subset of the higher rate codebook so that all code vectors for the lower rate encoder are contained in the codebook of the higher rate encoder. This way, the higher rate encoder need only search through those code vector in its codebook that are not already in the lower rate codebook. The quality measure for the higher rate encoder is then determinable with the help of computations already completed for the lower rate encoding.

Alternatively, a multistage codebook can be used wherein the first stage is used for the lower rate encoder, and the first two stages are used for the next higher rate encoder, etc. Again, in this implementation, all of the computations performed for the lower rate encoding do not need to be performed again but can still contribute to the higher rate encoding.

Analogous methods for rate determination can also be applied to mode selection. That is to say, such methods can also be applied to select whether unvoiced or silent encoder should be selected to form the encoded frame of speech data generated by the encoder 24. For instance, two, or more, modes are possible, each with a different coding delay. This is most easily achievable if all classes for a given mode have a common coding delay, but a different set of classes is used for different modes. In such an event, the mode selection can be based on a performance measure that takes into account which bit-rate, quality, and delay. Thus an overall performance measure can be defined as:

$$C=Q-\lambda R_{av}+\gamma D$$

wherein:

C is the overall performance;

Q denotes overall speech quality of the mode;

$R_{av}$ denotes the average bit rate of the mode;

D denotes the delay of the coder in a given mode; and $\lambda$ and $\gamma$ are constants chosen to control the relative importance given to rate and delay.

As Q represents the long-term measure of quality for a particular mode of operation, it is possible to determine the value of Q off-line, based upon subjective, or objective measurements of the performance of the coder when constrained to operate in such mode. Examples of such measures include the Mean Opinion Score (MOS), Degradation MOS (DMOS), Diagnostic Acceptability Measure (DAM), Diagnostic Rhyme Test (DRT), perceptually Weighted Signal-to-Noise Ratio (WSNR), or a quantity that is inversely proportional to perceptually Weighted Spectral Distortion (WSD). The performance measure C can be the basis for mode determination by analogous such methods.

Heuristic rules can also be used for mode determination to achieve some desired practical benefit, such as avoiding mode changes when the benefit of the change is very slight. The parameter Q is directly proportional to a meaningful subjective quality measure, such as Mean Opinion Score MOS), Degradation MOS (DMOS), Diagnostic Acceptability Measure DAM), Diagnostic Rhyme Test (DRT), perceptually Weighted Signal-to-Noise Ratio (WSNR), or inversely proportional to perceptually Weighted Spectral Distortion (WSD).

Figure 4:
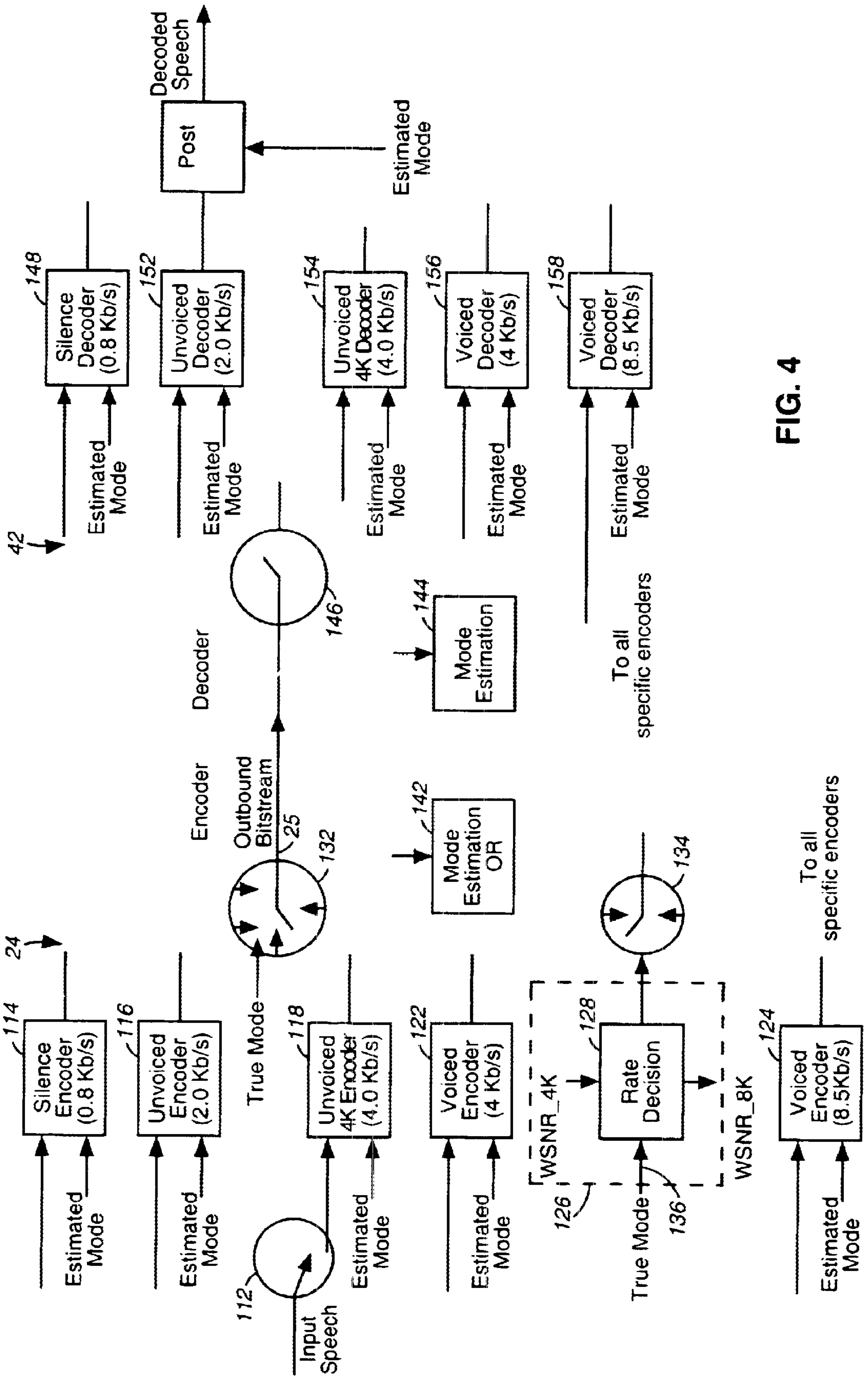
FIG. 4 illustrates a functional block diagram of a variable bit coder of another embodiment of the present invention.
Figure 5:
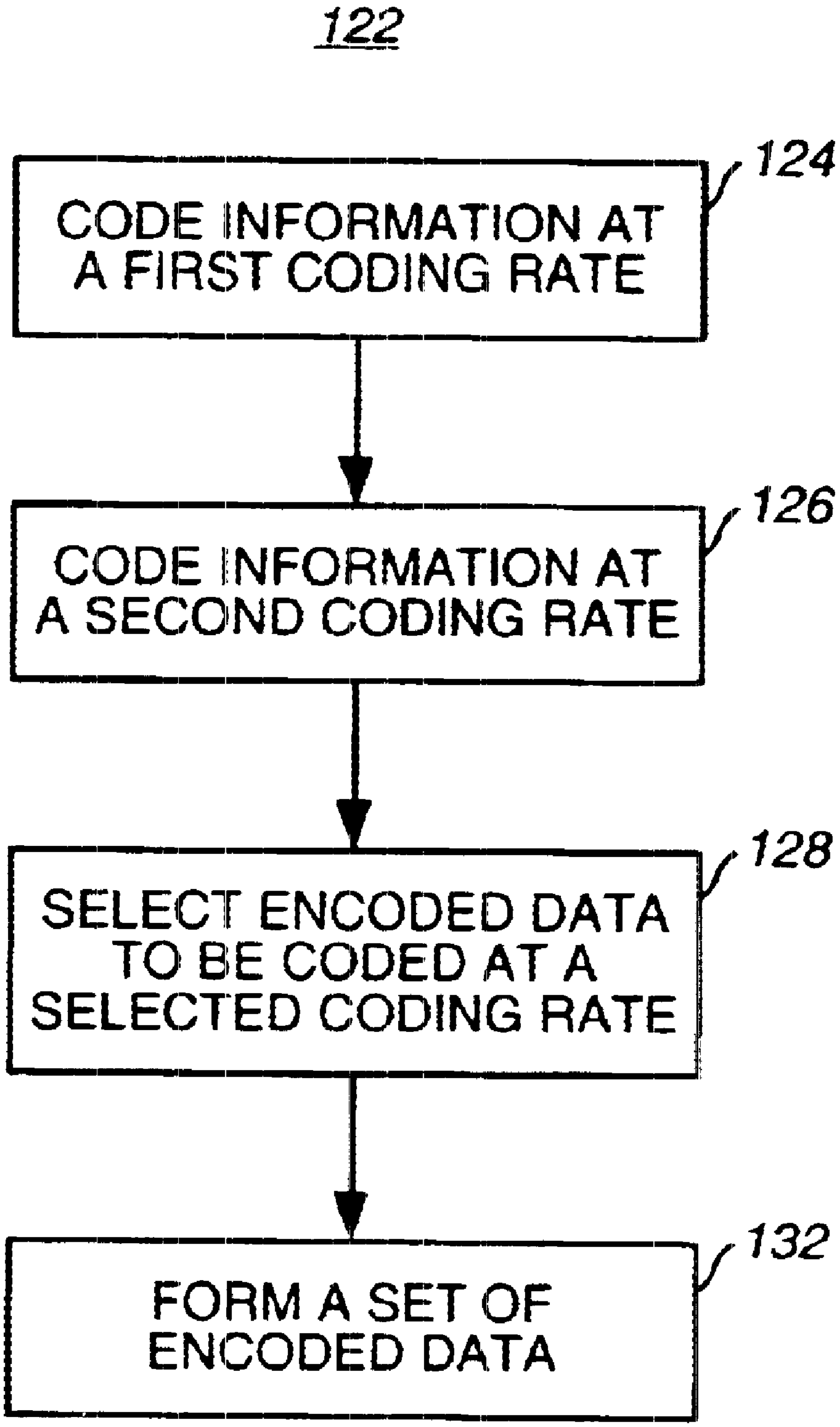
FIG. 5 illustrates a method flow diagram listing the method of operation of an embodiment of the present invention.

FIG. 4 illustrates a coder 24 and decoder 42 of another embodiment of the present invention. The coder 24 is operable in any selected one of several modes in which each mode is associated with a particular average bit rate. In this embodiment, the mode is dynamically estimated without the use of other in-band information. A "guess" of the mode is made at the coder 24 by combining an average rate estimation with logical constraints based upon the rates employed for each class of multi-class capable operation in each mode. In this implementation, further, post filter adaptation is utilized, based upon the mode guessing. A post filter is switched according to the estimated mode information which indicates a given average rate. And, quantization codebooks switching is further utilized, based upon the mode guessing. This technique permits the coder to employ a best quantization codebook for each mode of operation.

In the exemplary implementation shown in the figure, the coder is operable in three separate modes, a first mode, a second mode, and a third mode. Each mode is characterized by an average rate, and the average rates of different modes differ with one another.

Again, frames of input speech is provided by way the line 23 to a classifier 112 which is operable to assign each input speech frame to a one of three types, a silent class, an unvoiced class, or a voiced class. If the classifier classifies a frame of speech to be silent or unvoiced frames, the classifier forwards on the frame to an appropriate one of a silent encoder 114, an unvoiced encoder 116, or an unvoiced encoder 118. Silent frames are coded at, here, a 0.8 Kb/s rate and the unvoiced frames are coded at a 2.0 Kb/s rate when operated in a first mode or a second mode, and at a 4.0 Kb/s rate when operated in a third mode of operation.

If the classifier classifies a frame of speech to be a voiced frame, a frame of speech is applied by the classifier to a first voiced encoder 122 and to a second voiced encoder 124. The encoder 122 is operable at a 4.0 Kb/s rate, and the encoder 124 is operable at an 8.5 Kb/s rate, and the encoder 124 is operable at an 8.5 Kb/s rate. The frame of speech is encoded by both encoders, and a rate determination algorithm 126 examines a measure of the performance achieved on the frame of speech by each encoder 122 and 124 and makes a decision, indicated by the rate decision block 128 of which of the two rates by which to form an encoded frame of speech data for transmission upon a communication channel.

Elements 132 and 134 are operable to selectably apply an encoded speech frame incurred by a selected one of the encoders 114, 116, 118, 122, and 124 to the line 25.

A frame of speech data applied on the line 25 includes information regarding the class and the rate selected for that particular class of frame. The rate decision block 128 also makes sure that the average rate corresponds to the requirements of one of the first, second, and third modes. Mode selection is performed by an external signal indicated as the true mode 136 applied to the rate decision block 128. This signal, in one implementation, is based upon a decision by network management or a user. The coder 24 further utilizes a mode estimator 142 which is operable to ensure that the coder 24 is aware precisely what decision is taken at the decoder at any given time. This procedure avoids the need to send mode information from the encoder 24 upon a communication channel to a receiving station at which the decoder 42 forms a portion.

The mode estimator operates to guess the mode in which the encoders could be operable and employs two procedures: an average rate estimator, and a logical decision based upon mapping of encoding rates into modes. Viz., when the decoder observes the current encoding rate, such information is used to make some logical deduction about the likely mode. enacting of modes into encoding rates. When average rate estimation is utilized, an average rate estimator computes iteratively the average rate at frame n, R(n), by using the relation:

$$R(n)=\alpha R(n-1)+(1-\alpha)\rho$$

Wherein:

$\rho$ is the rate of the frame n.

The estimated average rate is compared with the target rates for each of the first, second, and third modes in order to make a decision for the mode guessing mechanism. The average rate decision is combined with the logical decision in order to arrive at a final mode guessing decision.

Logical constraints used to formulate a logical decision include, for example:

If the UV class rate is 4 Kb/s, the mode is forced to the third mode (only the third mode uses 4 Kb/s UV coding).

If the UV class rate is 2 Kb/s, the mode shall be the first or second mode (the final decision is based on the estimated average rate).

The decoder 42 is similarly shown to include a mode estimator 144, a data-driven switch 146, a silent decoder 148, unvoiced decoder elements 152 and 154, and voiced decoder elements 156 and 158. And, an element 162 selectively applies decoded frames generated by a selected one of the decoder elements to a post-filter 164.

In an implementation in which the voiced encoder elements employ an analysis-by-synthesis (AbS) scheme as is normally used in CELP (code excited linear prediction) coding, quality improvements are achievable by adapting conventional blocks of line spectrum pairs (LSP) quantization and post filtering to the mode information. Such improvements can be achieved for the LSP quantization by training different codebooks for each mode requirement and switching the codebook based upon the mode estimation at the encoder and the decoder. In particular, a third mode codebook is trainable on flat speech and mode 1, 2 codebooks are trainable on MIRS (Modified Intermediate Reference System) speech by which the input speech is filtered to replicate the effect of certain telephone handsets.

The postfilter is able to utilize a different set of parameters in each mode. Postfiltering provides the objective of improving a perceived speech quality by masking noise. Different modes have different average rates and require different amounts of noise masking. This is achieved by switching the postfilter parameters according to the mode estimate prepared by the mode estimator 144.

FIG. 4 illustrates a method, shown generally at 122, of an embodiment of the present invention. The method is operable to code digital information to form encoded data.

First, and as indicated by the block 124, the digital information is coded at a first coding rate to form a first-coded set of data. Then, and as indicated by the block 126, the digital information is coded at least at a second coding rate to form a second-coded set of data.

Then, and as indicated by the block 128, the encoded data is selected to be formed of a selected one of the first-coded set of data and at least the second-coded set of data responsive to indicia of coding-rate performance of the digital information coded at the first and second coding rates. Then, and as indicated by the block 132, the set of encoded data is formed of the selected one of the first and at least second-coded sets of data responsive to the selection.

Thereby, a manner is provided by which to encode a frame of data at a selected coding rate responsive to actual indicia of coding performance, subsequent to encoding of the frame of data at more than one coding rate.

The previous descriptions are of preferred examples for implementing the invention, and the scope of the invention should not necessarily be limited by this description. The scope of the present invention is defined by the following claims:

We claim:

1. In a communication system having a sending station for sending a set of encoded data over a communication channel, the encoded data being an encoded representation of digital information, the digital information comprising a selected one of voice data and non-voiced data, an improvement of a variable bit rate coder for coding the digital information into encoded data, said variable bit rate coder comprising:

a classifier for classifying the digital information to be the selected one of the voiced data and non-voiced data;

a first bit rate coder element coupled to received the digital information, when said classifier classifies the digital information to be voiced data, said first bit rate coder element for coding information at a first coding rate to form a first-coded set of data;

at least a second bit rate coder element also coupled to receive the digital information, when said classifier classifies the digital information to be voiced data, said at least second bit rate coder for coding the digital information at least at a second coding rate to form at least a second-coded set of data;

a coding rate selector coupled to receive at least indicia of coding-rate performance of said first bit rate coder element and of indicia of coding-rate performance of said at least the second bit rate coder element, said coding rate selector for selecting the encoded data to be formed of a selected one of the first-coded set of data and the at least the second-coded set of data selection by said coding rate selector responsive to values of the indicia of the coding-rate performance said first and at least second bit rate coder elements, respectively.

2. The variable bit rate coder of claim 1 wherein the second coding rate at which said second bit rate coder element codes the digital information is greater than the first coding rate at which said first bit rate coder element codes the digital information.

3. The variable bit rate coder of claim 1 wherein the indicia of the coding rate performance of said first and second bit rate coders, respectively, comprise values of the first-coded set of data and the second-coded set of data.

4. The variable bit rate coder of claim 3 wherein said coding rate selector calculates weighted signal-to-noise ratios related to the values of the first-coded and second-coded sets of data, respectively, and wherein the selection made by said coding rate selector is responsive to the weighted signal-to-noise values.

5. The variable bit rate coder of claim 4 wherein said coding rate selector selects the first-coded set of data to form the encoded data if the weighted signal-to-noise ratio calculated thereat and related to the first-coded set of data is at least as great as a first threshold.

6. The variable bit rate coder of claim 4 wherein said coding rate selector selects the first coded set of data to form the encoded data if the weighted signal-to-noise ratio related the first-coded set of data is less than a first threshold and that of the second-coded set of data is less than a second threshold.

7. The variable bit rate coder of claim 4 wherein said coding rata selector selects the second coded set of data to form the encoded data if the weighted signal-to-noise ratio related to the first-coded set of data less than a first threshold and the weighted signal-to-noise ratio of the second-coded set of data is at least as great as a second threshold.

8. The variable bit rate coder of claim 1 wherein the nonvoiced data further comprises a selected one of unvoiced data and silent data, said classifier further for classifying the nonvoiced data to be the selected on of the unvoiced data and the silent data.

9. The variable rate coder of claim 8 further comprising a silence coder element coupled to said classifier, said classifier further for providing the digital information to said silence coder element when said classifier determines the nonvoiced data to be comprised of silent data and said silence coder element for encoding the silent data provided thereto.

10. The variable bit rate coder of claim 8 further comprising an unvoiced coder element coupled to said classifier, said classifier further for providing the digital information to said unvoiced coder element when said classifier determines the nonvoiced data to be comprised of unvoiced data, and said unvoiced coder element for encoding the unvoiced data provided hereto.

11. The variable bit rate coder of claim 1 wherein the digital information comprises the selected one of the voiced data and nonvoiced data, said variable bit rate coder further comprising a nonvoiced coder element coupled to receive the digital information, said nonvoiced coder element for coding the digital information at a third coding rate to form a third coded-set of data, and said coding rate selector further coupled to received indicia of coding rate performance of said nonvoiced coder element, said coding rate selector for selecting the encoded data to be formed of a selected one of the first coded set of data, the second-coded set of data, and the third-coded of data, and the selection by said coding rate selector further responsive to values of the indicia of the coding-rate performance of said nonvoiced coder element.

12. The variable bit rate coder of claim 11 wherein said coding rate selector calculates weighted signal-to-noise ratios related to the values of the first-coded set of data, related to the values of the second-coded set of data, and related to values of third-coded set of values, and wherein the selection made by said coding rate selector is responsive to the weighted signal-to-noise ratios.

13. The variable bit rate coder of claim 12 wherein said coding rate selector further alters the weighted signal-to-noise ratios by a rate distorter and wherein the selection made by said coding rate selector is responsive to the weighted signal-to-noise ratios once altered by said rate distorter.

14. In a method for communicating a set of encoded data upon a communication channel, the encoded data on encoded representation of digital information, and improvement of a method for coding the digital information into the encoded data, said method comprising:

coding the digital information at a first coding rate to form a firs-coding set of data;

coding the digital information at least at a second coding rate to form at least a second-coded set of data;

calculating signal-to-noise ratios related to values of the first-coded and second-coded sets of data;

selecting the encoded data to be formed of a selected one of the first-coded set of data and the at least the second-coded set of data signal-to-noise ratios of the first-coded set of data and the second-coded set of data responsive to of coding-rate performance of said first and second operations of coding, respectively, such that the first-coded set of data is selected to form the encoded data if the signal-to-noise ratio related to the first-coded set of data is less than a first threshold and the signal-to-noise ratio of the second-coded set of data is less than a second threshold, and forming the set of encoded data of the selected one of the first- and at least second-coded sets of data, respectively, responsive to selection made during said operation of selecting.

15. The method 14 wherein said operation of selecting comprises selecting the second-coded set of data to form the encoded data of the signal-to-noise ratio related to the first-coded set of data if the signal-to-noise ratio related to the first-coded set of data is less than the first threshold and the signal-to-noise ratio of the second-coded set of data is at least as great as the second threshold.

16. In a communication system having a sending station for sending a set of encoded data over a communication channel, the encoded data being an encoded representation of digital information, an improvement of a variable-bit rate coder for coding the digital information into encoded data, said variable bit rate coder comprising:

a first bit rate coder element coupled to receive the digital information, said first bit rate coder element for coding the digital information at a first coding rate to form a first-coded set of data;

at least a second bit rate coder element also coupled to receive the digital information, said at least second bit rate coder for coding the digital information at least at a second coding rate to form at least a second-coded set of data;

a coding rate selector coupled to receive at least indicia of coding-rate performance, comprised of values of the first-coded set of data, of said first bit rate coder element and of indicia of coding-rate performance, comprised of values of the second-coded set of data, of said at least the second bit rate coder element, said coding rate selector for calculating weighted signal-to-noise ratios related to the values of the first-coded and second-coded sets of data and for selecting the encoded data to be formed of a selected one of the first-coded set of data and the at least the second-coded set of data, selection by said coding rate selector responsive to the weighted signal-to-noise values, such that said coding rate selector selects the first-coded set of data to form the encoded data if the weighted signal-to-noise ration related to the first-coded set of data is less than a first threshold and that of the second-coded set of data is less than a second threshold.

17. In a communication system having a sending station for sending a set of encoded data over a communication channel, the encoded data being an encoded representation of digital information, an improvement of a variable-bit rate coder for coding the digital information into encoded data, said variable bit rate coder comprising:

a first bit rate coder element coupled to receive the digital information, said first bit rate coder element for coding the digital information at a first coding rate to form a first-coded set of data;

at least a second bit rate coder element also coupled to receive the digital information, said at least second bit rate coder for coding the digital information at least at a second coding rate to form at least a second-coded set of data;

a coding rate selector coupled to receive at least indicia of coding-rate performance, comprised of values of the first-coded set of data, of said first bit rate coder element and of indicia of coding-rate performance, comprised of values of the second-coded set of data, of said at least the second bit rate coder element, said coding rate selector for calculating weighted signal-to-noise ratios related to values of the first-coded and second-coded sets of values and for selecting the encoded data to be formed of a selected one of the first-coded set of data and the at least the second-coded set of data, selection by said coding rate selector responsive to the weighted signal-to-noise values, such that said coding rate selector selects the second-coded set of data to form the encoded data if the weighted signal-to-noise ration related to the first-coded set of data is less than a first threshold and the weighted signal-to-noise ratio of the second-coded set of data is at least as great as a second threshold.

* * * * *